J. J. MARCY.
Lamp Chimney Holder.
No. 2,412. Reissued Dec. 4, 1866.
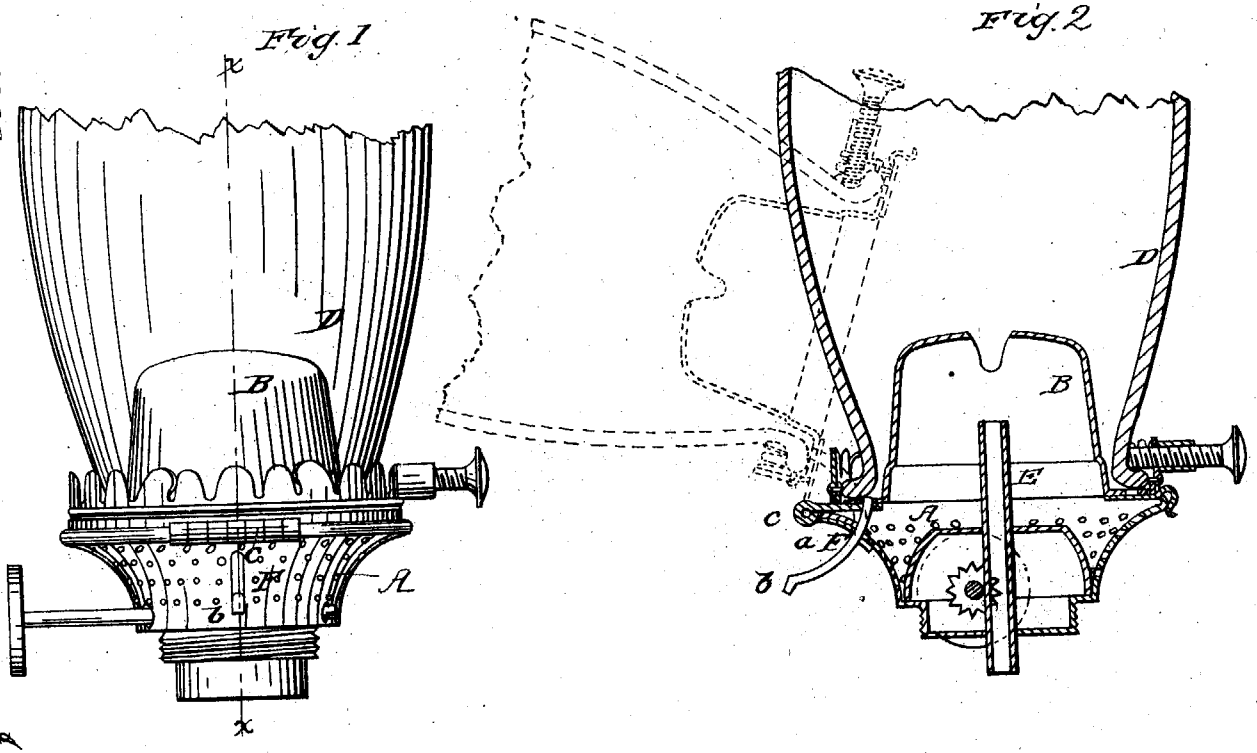
Witnesses
J. W. Coombs
C. H. Bigly
Inventor
J. J. Marcy
per Munn & Co
Attorneys.
N. PETERS, Photo-Lithographer, Washington, D. C.

United States Patent Office.

IMPROVEMENT IN LAMP-BURNERS.

EDWARD MILLER, ASSIGNEE OF JOHN J. MARCY, OF MERIDEN, CONNECTICUT.

*Letters Patent No.* 39,320, *dated July* 21, 1863; *reissue No.* 2,412, *dated December* 4, 1866.

SPECIFICATION.

TO ALL WHOM IT MAY CONCERN:

Be it known that J. J. MARCY, of Meriden, in the county of New Haven, and State of Connecticut, invented a new and useful Improvement in Lamp-Burners; and I do hereby declare the following, when taken in connection with the accompanying drawings, and the letters of reference marked thereon, to be a full, clear, and exact description of the same, and which said drawings constitute part of this specification, and represent, in—

Figure 1, an external view of a lamp-burner, with my improvement applied to it.

Figure 2, a vertical section of the same taken in the line *x x*, fig. 1.

Similar letters of reference indicate corresponding parts in the two figures.

This invention relates to a new and useful improvement in lamp-burners which are provided with draught chimneys, and a hinged cone or deflector, such as may be seen in many coal-oil burners. These hinged cones or deflectors are very convenient, as they admit of the wick-tube of the burner being readily exposed for trimming and lighting.

The within-described invention consists in the use of an improved form of stop to hold the cone and chimney in a proper inclined position, and at the same time serve as a thorough protection to the hinge of the cone, so that the latter cannot become broken or injured by the throwing back of the cone or chimney. To enable those skilled in the art to fully understand and construct this invention, I will proceed to describe it.

A represents the lower and main part of a coal-oil burner, and B is the cone or deflector, which is connected to the part A by means of a hinge or joint C. D is the glass chimney, which may be attached to the cone or deflector B in any of the known ways. E is the wick-tube, which is fitted in the part A, of the burner, in the usual or any proper way. The above-named parts are all well known, and therefore do not require a particular description. To the cone or deflector there is attached a curved rod F. This rod may be attached to the cone in line with the centre of the hinge or joint C, and the rod is so curved as to form a portion of a circle, of which the pintle *a*, of the hinge or joint, is the centre. The lower end of the rod F passes through the side of the part A of the burner, and it is bent, as shown at *b*, so as to form a catch to prevent the end of the rod being drawn through the burner. When the cone and chimney are turned over or thrown back, as shown in red outline, in fig. 2, the bent end, *b*, of the rod will catch against the side of the burner, and serve as a stop to hold the cone and chimney at the proper or desired degree of elevation, as will be fully understood by referring to fig. 2. This curved rod, it will be understood, while it serves as a stop to hold or retain the cone and chimney, does not render the hinge or joint liable to be broken or injured by any strain or concussion, even the cone and chimney be suddenly thrown over or back. This is an important feature of the invention, and the result is due to the attachment of the rod F at the inner side of the pintle *a*, of the hinge; for if a stop were applied or arranged in such a manner as to admit of the hinge being strained under a leverage power, when suddenly arrested or stopped, as would be the case if the stop were attached to the hinge, at the outer side of the pintle *a*, and made to strike against a projection on the part A. Stops of this kind are frequently used on hinges, and in certain cases they answer a good purpose; but they would not be durable for the within-described purpose, as the parts are necessarily made too light to admit of such an arrangement being constructed with a requisite degree of strength.

I do not claim the turning over of a lamp chimney to give access to the wick; nor do I claim broadly a stop to permit a partial raising or turning over of the chimney, as I am aware that such have before been used in various forms; but, having thus described the invention of the said J. J. MARCY, what I claim as new therein, and desire to secure by Letters Patent, is—

The combination, with the hinge C, of the rigid curved rod F, fixed to the cone B, projecting downward through the shell A, between the hinge and the wick-tube, and provided with a bent end or equivalent stop *b*, which, coming in contact with the under side of the said shell, operates by a tensional strain upon the rod F to limit the turning of the chimney, all as herein described.

EDWARD MILLER.

Witnesses:

LINUS BIRDSEY,

E. C. BIRDSEY.